United States Patent [19]
Dyer

[11] Patent Number: 6,104,793
[45] Date of Patent: Aug. 15, 2000

[54] FACILITY MODEM-TO-MODEM APPLICATION

[76] Inventor: Bruce F. Dyer, 1209 Eaton Dr., Las Vegas, Nev. 89102

[21] Appl. No.: 08/847,589

[22] Filed: Apr. 27, 1997

[51] Int. Cl.[7] .................................................. H04M 15/00
[52] U.S. Cl. ............................ 379/114; 379/127; 379/115
[58] Field of Search ..................................... 379/112, 114, 379/144, 900, 901, 902, 903, 219, 220, 221, 222, 115, 127; 370/352, 353, 354, 298, 299

[56] References Cited

U.S. PATENT DOCUMENTS

| | | | |
|---|---|---|---|
| 5,148,474 | 9/1992 | Haralambopoulos et al. | 379/114 |
| 5,524,142 | 6/1996 | Lewis et al. | 379/114 |
| 5,729,594 | 3/1998 | Klingman | 379/93.12 |
| 5,737,414 | 4/1998 | Walker et al. | 380/4 |
| 5,745,556 | 4/1998 | Ronen | 379/114 |
| 5,864,610 | 1/1999 | Ronen | 379/114 |
| 5,883,939 | 3/1999 | Friedman et al. | 379/112 |

*Primary Examiner*—Curtis A. Kuntz
*Assistant Examiner*—Rexford N Barnie
*Attorney, Agent, or Firm*—Ward & Olivo

[57] ABSTRACT

The present invention comprises a 900 modem to modem application using the AT&T MultiQuest® Vari-A-Bill® feature designed in an effort to enhance an existing "charge free" medical credentials verification service. In accordance with the present invention, the calling party is simply required to dial a 1-900-NXX-XXXX telephone number from their computer terminal, whereby they are prompted to select the desired service(s) from a menu, and based on their menu selection(s), the appropriate charge(s) will be billed to the calling party's telephone bill. This novel invention allows the general public, hospitals and other institutions to quickly and efficiently obtain medical credential information from the convenience of their own computers.

5 Claims, 4 Drawing Sheets

ARKANSAS STATE MEDICAL BOARD
           CENTRALIZED CREDENTIALS
             VERIFICATION SERVICE

2100 RIVERFRONT DRIVE, SUITE 200
           LITTLE ROCK, ARKANSAS 72202-1793
         VOICE (501)296-1802, FAX (501)296-1803

YOU HAVE CONNECTED TO
                  1-900-555-ASMB
$75.00/INITIAL CREDENTIALING, $35.00/RECREDENTIALING, $20.00/VERIFICATION
             ACCESS AVAILABLE BY CONTRACT ONLY
         PERSONAL SUPPORT 9AM TO 4PM CENTRAL, MONDAY-FRIDAY

*NOT AVAILABLE AT THIS TIME
```

```
                                                                    420

ARKANSAS STATE MEDICAL BOARD
                   CCVS SELECTIONS

A)  INITIAL CREDENTIALING    $75.00/INQUIRY
         B)  RECREDENTIALING          $35.00/INQUIRY *
         C)  DETAILED VERIFICATION    $20.00/INQUIRY
         D)  ASMB MESSAGE CENTER      $ 1.00
             (UPDATED, JANUARY 05, 1996)
         E)  EXIT SYSTEM

*NOT AVAILABLE AT THIS TIME
```

FACILITY MODEM-TO-MODEM APPLICATION

TECHNICAL FIELD OF THE INVENTION

This invention relates in general to 800 and 900 number programs and more particularly to a pay-per-call modem-to-modem application with a variable rate billing structure.

BACKGROUND OF INVENTION

Telecommunications networks presently offer a number of different services to their subscribers. Such services (and their features) include, for example, 800 service (automatic call distribution (ACD), call queuing, interactive announcements, digit collection, etc.), virtual private networks (abbreviated dialing, authorization codes, caller privileges, etc.) and plain old telephone service (call waiting, call forwarding, automatic call back, etc.).

Currently, a switch in a telecommunications network processes a telephone call in accord with the services associated with only one of the parties involved in the telephone call. For example, if a called party is a subscriber of a particular service, e.g., an 800 service, then the switch processes the call in accordance with that service without considering the telephone services subscribed to by the calling party.

The value-added services (e.g., 700 number, 800 number and 900 number services) are designed for mass calling to a service provider ("sponsor") number wherein the calling party generally pays for the call. The 900 number services (e.g., DIAL-IT® 900-service offered by AT&T) allow sponsors to offer a variety of value-added telecommunication services (Dial-A-Prayer, Televoting, etc.), to their clientele ("calling party") for which additional charges are assessed. To access the service, the calling party dials, illustratively, a 1-900-NXX-XXXX number and is routed to a Carrier Switch Network ("CSN") Mass Announcement System ("MAS") where the calling party listens to the sponsor's prerecorded announcement. At present, the sponsors select the rate callers will pay for the service when the 900 number is assigned by the CSN.

The 900 number and the rate selected by a sponsor are stored in a table in a CSN billing system. When a call is made to a sponsor's 900 number, the central office switch in the Local Exchange Company ("LEC") makes a call record including the calling and called party of each call. These call records are transported periodically (typically every month) from the LEC to the CSN, and rated using the appropriate sponsor's rate table. This rating process involves a table look-up process to determine each calling party's charge for a call to a particular sponsor's number. The resulting calling party charge record is then returned to the LEC which includes the charges as part of the calling party's monthly telephone bill.

In accordance with billing methods and apparatus of the prior art, the calling party is billed for charges incurred during a call made over a communication network to a sponsor location (equivalently referred to herein as called party) by: 1) establishing an Integrated Services Digital Network ("ISDN") call connection between the network and the called party location; 2) the network transmitting the caller's identification number to the called location, over that same ISDN connection; and 3) the network receiving from the called location, again over that same ISDN connection, billing information specifying charges incurred by the calling party during the call.

This arrangement provides the sponsor with more flexibility in billing callers for a sponsor's value-added services. Billing flexibility is achieved in accordance with the prior art by creating a separate billing record for each call using sponsor-provided call billing parameters which can be updated during the call by the sponsor. Desirably, determining sponsor charges and creating a billing record on a call-by-call basis eliminates the need for the table look-up procedure required by other call billing methods.

Another billing arrangement known to applicants which also solves the previously-described problems is described in the allowed patent application of I. Benyacar, et al., Ser. No. 509,662 filed on Apr. 16, 1990, and entitled "Method and Apparatus for the Billing of Value-Added Communication Calls." The Benyacar application, however, solves these problems by enabling the called-party location to access the network's operations support system (DSD-NCP 180 of FIG. 1) substantially in real time to specify call rating data and other associated call rate modifiers. In Benyacar, call rating information is sent to the network's operations support system via a separate connection which is different from the calling-to-called-party location connection, whereas, according to other methods, call billing information is sent to the network's billing recording toll switch (e.g., the terminating toll switch) (TTS/SN 160 of FIG. 1) using the same calling-to-called-party location connection.

Also described in accordance with various features of the prior art, caller charges may be specified as call billing parameters which may be changed in real time during the call and which may vary depending on the call type, time-of-day, geographic region, etc. These called party or sponsor-specified caller charges are then incorporated into the standard Automated Message Accounting ("AMA") record generated by the CSN for each call and sent to a network billing system which processes the sponsor-specified caller charges for inclusion in the network bill sent to the customer.

New CSN services now provide the sponsor more flexibility in defining their services by routing the value-added calls to a sponsor-selected location. One such service is the MultiQuest® telecommunications service offered by AT&T.

AT&T has patented a technology that is referred to as MultiQuest® in U.S. Pat. No. 5,187,710. It is for use by 900/976 number service providers at only those locations licensed and equipped to use AT&T's ISDN Primary Rate Interface. Vari-A-Bill®, a service of MultiQuest®, is an addition to conventional ISDN capabilities.

The Vari-A-Bill® system allows the licensee's equipment to signal price changes to the AT&T network over a separate channel while a call to the 900-number is in progress. Five flexible options may be invoked: 1) Free call, i.e., no charge for the entire call; 2) Flat Charge, i.e., the price of the call is fixed at a set fee; 3) New Rate, i.e., the per minute rate can be changed upward and downward; 4) Premium charge, i.e., this would be a flat charge added to the per minute rate; and 5) Premium credit, i.e., this refers to a flat amount to be deducted from the total price of the call (The total price would not go below $0).

Therefore, without ISDN or the teachings found in Benyacar, U.S. Pat. No. 5,003,584, the needed billing account information was only able to be assembled from several disparate sources after the call was completed (too late to deny unbillable services).

These new services enable a sponsor to provide a greater variety of value-added services which may now include interactive dialog between the caller and the sponsor's agent. Moreover, there is a continuing need for the CSN to add more flexible billing for these sponsor-provided value-added services.

SUMMARY OF INVENTION

The present invention comprises a 900 modem-to-modem application using the AT&T MultiQuest® Vari-A-Bill® feature designed in an effort to enhance an existing "charge free" medical credentials verification service. The new program allows the general public, hospitals and other institutions a quick and efficient means of obtaining medical credential information from the convenience of their own computer terminals.

The calling party is simply required to dial a 1-900-NXX-XXXX number (For example, 1-900-555-ASMB) from their computer terminal, wherein she is prompted to select the desired service(s) from a menu, and based on the menu selection(s), the appropriate charge(s) will appear on the calling party's telephone bill. Access to the program of the present invention would be available by contract only. In accordance with the service agreement, the actual caller rates would vary according to the location of the calling party and the service desired. Examples of services provided in accordance with the present invention include: initial credentialing at $50.00 per inquiry for in state callers and $75.00 per inquiry for out of state callers; recredentialing at $20.00 per inquiry for in state callers and $35.00 per inquiry for out of state callers; detailed verification at $15.00 per inquiry for in state callers and $20.00 per inquiry for out of state callers; DEA or malpractice information at $5.00 each for in state callers ($10.00 for both DEA and malpractice information) and $7.00 each for out of state callers ($14.00 for both DEA and malpractice information); and the BBS message center service (for example, ASMB message center) at $0.50 for in state callers and $1.00 for out of state callers.

The present invention will allow hospitals, other institutions and individuals from around the country to access physicians' licensing and certification information directly from their own computers. By dialing a 1-900-NXX-XXXX number via their computer's modem, a BBS allows the calling party to select the desired information and services from a menu. Note that the choice of services are available via contract only. Accordingly, depending on the information sought, the amount for each service may vary. Also, a different rate will be applied on the basis of the call's origin, i.e., the calling party's geographic location. The 1-900 service allows for multiple charges on that same call, thus allowing the end user to access information on more than one physician. All charges will then appear on the caller's telephone bill.

Once the calling party places the 1-900 call from her computer terminal via modem, AT&T routes the call to a sponsor. In turn, by outdialing through one of its switching facilities, the sponsor sends the call to the remote BBS (for example, to the computer maintained by the service provider). At the same time, using a second modem to outdial to the remote BBS over a simulated data channel ("D-channel"), Vari-A-Bill® data, which is the specific amount to be charged to the calling party's telephone bill, is sent. Also, for call association, the data is attached to the line the caller dialed in on, and, during the course of the call, is sent to AT&T as a billing record.

To communicate with the remote BBS, the sponsor has in place a system comprising: 1) a customized monitoring program; 2) a modem link, through which the provider sends the sponsor the billing information; 3) a D-channel telephone circuit dedicated to that modem link for all incoming 1-900 calls; and 4) one telephone circuit for each 1-900 caller connected through the sponsor s switch to the remote BBS.

Other objects, features, and characteristics of the present invention, as well as the methods of operation and functions of the related elements of the structure, will become more apparent upon consideration of the following detailed description with reference to the accompanying drawings, all of which form a part of this specification.

BRIEF DESCRIPTION OF THE DRAWINGS

For a more complete understanding of the present invention, reference is now made to the following drawings, in which:

FIG. 4 shows a sample provider's menu screen (for out-of-state callers showing a higher rate for services) prior to activation of the 900 service where the service provider is Arkansas State Medical Board.

DETAILED DESCRIPTION OF THE PREFERRED EMBODIMENT

The present invention comprises a 900 modem-to-modem application using the AT&T MultiQuest® Vari-A-Bill® feature designed in an effort to enhance an existing "charge free" medical credentials verification service. The new program allows the general public, hospitals and other institutions a quick and efficient means of obtaining medical credential information at varied rates.

Figure 1:
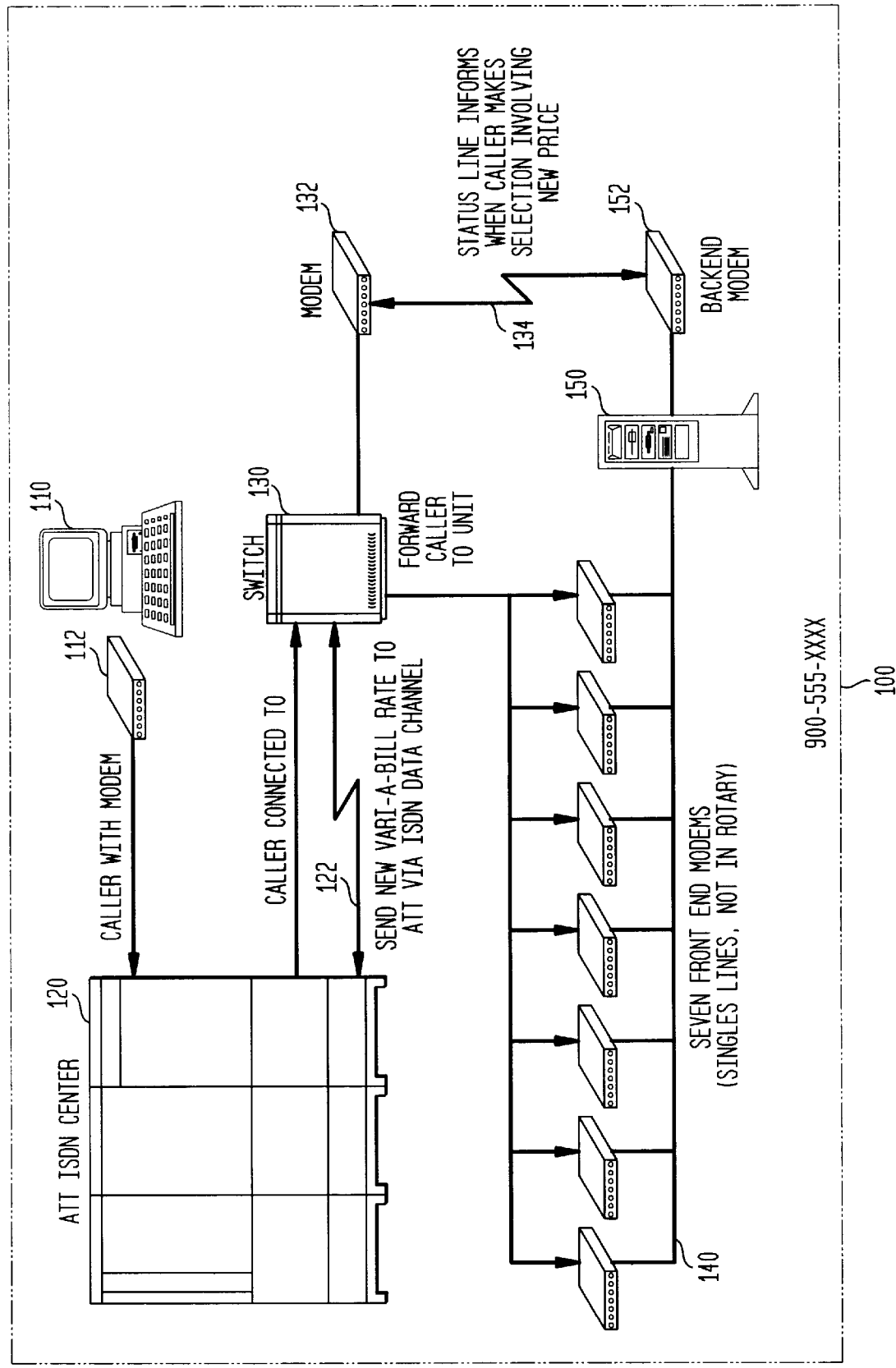
FIG. 1 shows a schematic representation of a telecommunications system for use with the present invention.

Turning now to FIG. 1, there is shown a computer-telephony system 100 which is the backbone of the present invention. The preferred embodiment of the present invention shown in FIG. 1 allows callers to access medical credential information from their home or office computer terminal 110 via modem 112 connection.

In accordance with the present invention, the calling party is simply required to dial a 1-900-NXX-XXXX (for example, 1-900-555-ASMB) from her computer terminal 110. Once the end user places the 1-900 call via modem, AT&T routes the call through ISDN center 120 to the sponsor's switch center 130. This sponsor's switch center 130 performs two functions. First, it forwards the calling party's call to the service provider's computer 150. Second, it outdials to backend modem 152 at the service provider's computer 150.

Figure 2:
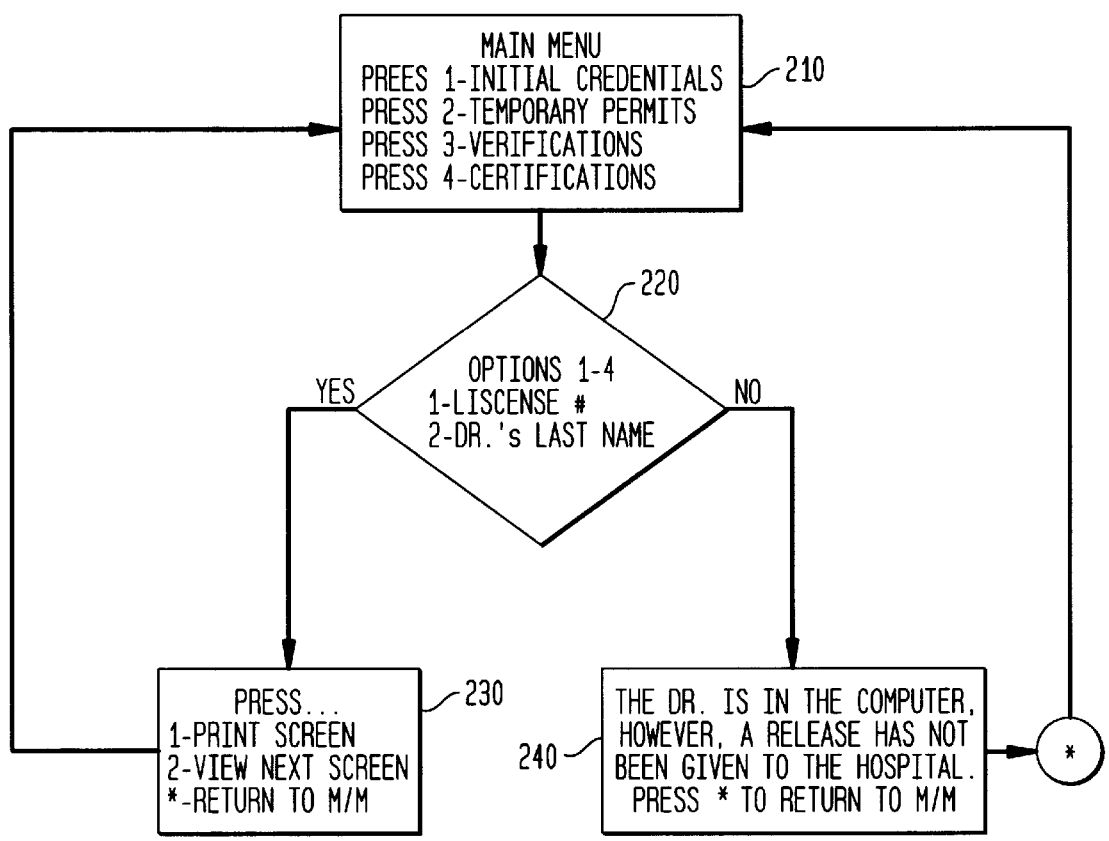
FIG. 2 shows a simplified rendition of services as accessed on the remote BBS maintained by the service provider.

First, by outdialing through one of its switching facilities, the sponsor switch center 130 sends the call to the remote BBS which provides the end user with a menu of services as illustrated by the flow diagram of FIG. 2., and in the application of the present invention, this is at the service provider's computer 150 maintained by the service provider. In order to communicate with the remote BBS, the sponsor would have in place a system comprising: 1) a customized monitoring program; 2) a modem link, through which the service provider sends the sponsor the billing information; 3) a telephone circuit dedicated to the modem link (D-channel) for all incoming 1-900 calls; and 4) one telephone circuit for each 1-900 caller connected through the sponsor's switch center 130 to the remote BBS. The calling party is connected to the service provider's computer 150 via one of a plurality of front end modems 140, and is provided with a menu of services as shown in FIG. 2.

The calling party then makes a selection from Main Menu 210, where the choices may comprise Initial Credentials, Temporary Permits, Verifications, Certification, Exit, etc. Next, the calling party is prompted to enter the name and/or license number of the physician whose credentials are sought, as shown in menu 220. If the system has records of the physician requested, the calling party is again prompted, but with menu 230 which provides the calling party with viewing options, such as Print Screen, View Next Screen, etc. Each menu also provides an escape function which allows the user to return to the Main Menu 210 at any time. For example, it may require the end user to press a certain key, such as the asterisk (*).

On the other hand, if the physician is not in the system's records or a release has not been given to the hospital to permit them to give access to those records, then a screen is displayed with the appropriate message. For example, screen 240 of FIG. 2 may be displayed if no release was given. The calling party may then be prompted to return to Main Menu 210.

The process illustrated in FIG. 2 and described above may be repeated by the end user as many times as desired for as many physicians desired without having to log out and call again. Also, the billing system allows multiple requests to be billed all on the same bill.

The second function of sponsor switch center 130, which occurs at the same time as the first function, allows the sponsor's switch center 130, using a second modem 132, to outdial to the remote BBS, and send Vari-A-Bill® data, which is the specific amount to be charged to the calling party's phone bill, over the simulated ISDN D-channel 122. This second modem 132 also connects to backend modem 152 at the service provider's computer 150. This serves as a status line 134 which informs the sponsor when a caller makes a selection involving a new price. The sponsor then sends the new Vari-A-Bill® rate information to AT&T ISDN center 120 via ISDN D-channel 122.

Furthermore, after the calling party selects the desired service(s) from the menu, and based on the menu selection (s), the appropriate charge(s) will later appear on their telephone bill. Since access to this program is available by contract only, the rates are determined by these agreements. Further, the actual caller rates vary according to the location of the calling party and the service(s) desired.

Figure 3:
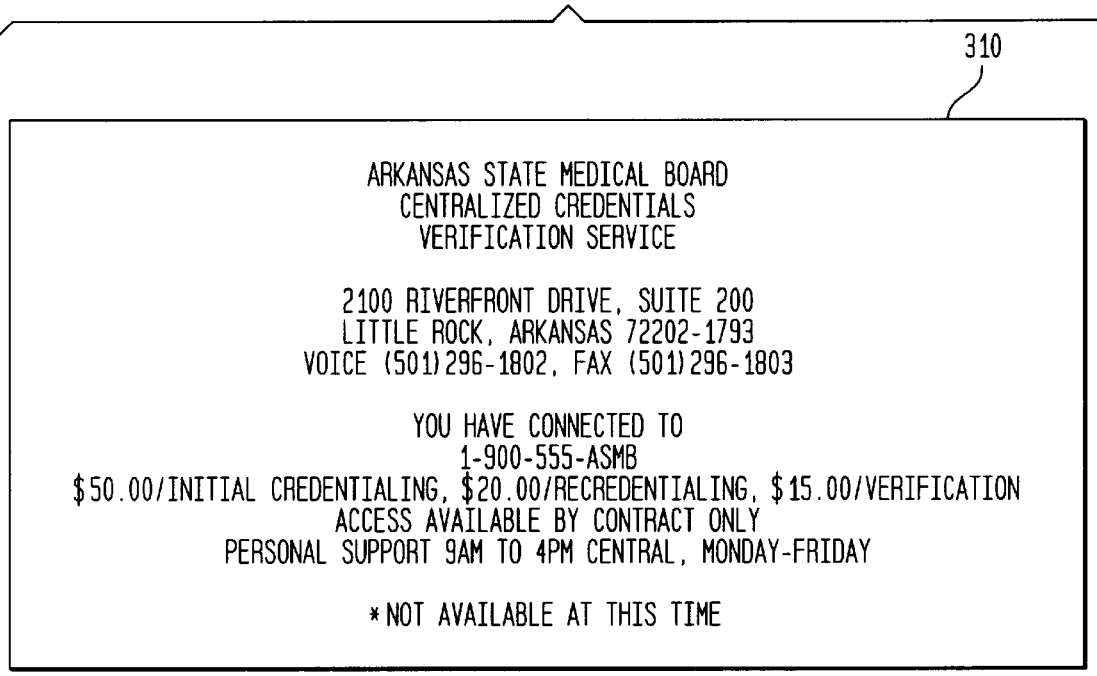
FIG. 3 shows a sample provider's menu screen (for in-state callers showing a lower rate for services) prior to activation of the 900 service where the service provider is Arkansas State Medical Board.
Figure 3:
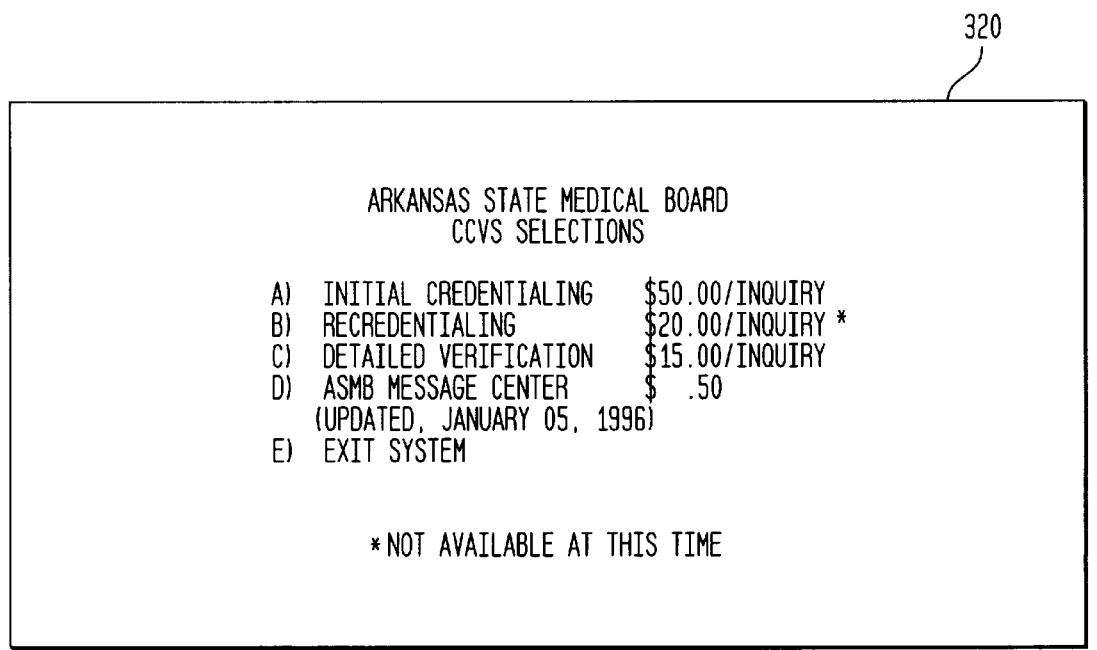

Shown in FIGS. 3 and 4 are sample menu screens which appear to the calling party prior to activation of the 1-900 service. FIG. 3 shows information presented to in-state callers, while FIG. 4 shows information presented to out-of-state callers. These menu screens present the calling party with general information regarding the service(s) provided, such as the address and phone number of the service provider, and the rates of the various services (see screens 310, 320, 410 and 420).

In accordance with the present invention, services may include: Initial Credentialing at $50.00 per inquiry for in-state callers and $75.00 per inquiry for out-of-state callers; Recredentialing at $20.00 per inquiry for in-state callers and $35.00 per inquiry for out-of-state callers; Detailed Verification at $15.00 per inquiry for in-state callers and $20.00 per inquiry for out-of-state callers; DEA or malpractice information at $5.00 each for in-state callers ($10.00 for both DEA and malpractice information) and $7.00 each for out-of-state callers ($14.00 for both DEA and malpractice information); and a BBS message center service (for example, Arkansas State Medical Board) at $0.50 for in-state callers and $1.00 for out-of-state callers.

The application of the present invention will allow hospitals, other institutions and individuals from around the country to access physicians' licensing and certification information from their computers. By dialing 1-900-NXX-XXXX via their computer's modem, a BBS allows the calling party to select the desired information and services from a menu. Depending on the information sought, the amount for each service may vary. Furthermore, a different rate will be applied on the basis of the call's origin, i.e. the caller's geographic location.

Also, the 1-900 service allows for multiple charges on that same call, thus allowing the end user to access information on more than one physician with all charges then appearing on the caller's telephone bill.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A method of processing a call between calling and called parties in a communications network comprising the steps of:

placing a call via a first modem;

routing said call through an Integrated Services Digital Network center to a local switch center;

communicating said call with a remote bulletin board service, said communicating comprising:

a customized monitoring program;

a second modem for transmitting billing data;

a first telephone circuit connected to said first modem for receiving incoming calls; and a plurality of telephone circuits connected to said local switch center and said remote bulletin board service.

2. A method of processing a call according to claim 1, wherein said switch center forwards said call to a computer database and outdials to said second modem at said computer database.

3. A method of processing a call according to claim 2, wherein said outdialing transmits said associated call information to said remote bulletin board service.

4. A method of processing a call according to claim 1, wherein said calling party selects the desired service.

5. A method of processing a call according to claim 4, wherein said calling party is billed for said service.

\* \* \* \* \*

UNITED STATES PATENT AND TRADEMARK OFFICE
CERTIFICATE OF CORRECTION

| | |
|---|---|
| PATENT NO. | : 6,104,793 |
| APPLICATION NO. | : 08/847589 |
| DATED | : August 15, 2000 |
| INVENTOR(S) | : Bruce F. Dyer |

It is certified that error appears in the above-identified patent and that said Letters Patent is hereby corrected as shown below:

Title page Item [22], replace "Apr. 27, 1997" with -- Apr. 24, 1997 --.

Signed and Sealed this

Tenth Day of March, 2009

JOHN DOLL
*Acting Director of the United States Patent and Trademark Office*